(12) United States Patent
Kyung et al.

(10) Patent No.: US 7,584,399 B2
(45) Date of Patent: Sep. 1, 2009

(54) APPARATUS AND METHOD FOR TRANSMITTING AND RECEIVING A SIGNAL IN A COMMUNICATION SYSTEM

(75) Inventors: Gyu-Bum Kyung, Suwon-si (KR); Seok-Hyun Yoon, Seoul (KR); Jae-Yoel Kim, Gunpo-si (KR); Young-Ho Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 560 days.

(21) Appl. No.: 11/323,756

(22) Filed: Dec. 30, 2005

(65) Prior Publication Data

US 2006/0150061 A1    Jul. 6, 2006

(30) Foreign Application Priority Data

Dec. 31, 2004   (KR)   ........................ 10-2004-0118320
Dec. 29, 2005   (KR)   ........................ 10-2005-0134430

(51) Int. Cl.
*H03M 13/00* (2006.01)

(52) U.S. Cl. .................... 714/752; 714/751; 714/786
(58) Field of Classification Search .................. 714/751, 714/752, 755, 758, 790
See application file for complete search history.

(56) References Cited

U.S. PATENT DOCUMENTS

| | | | |
|---|---|---|---|
| 6,329,308 B1 | 12/2001 | Kenmochi et al. | |
| 7,165,205 B2 * | 1/2007 | Blankenship et al. | ........ 714/752 |
| 7,260,763 B2 * | 8/2007 | Sukhobok et al. | ........... 714/758 |
| 7,406,648 B2 * | 7/2008 | Kim et al. | .................... 714/758 |
| 2004/0185886 A1 | 9/2004 | Matsumoto | |
| 2004/0240481 A1 | 12/2004 | Matsumoto | |
| 2007/0162811 A1 | 7/2007 | Matsumoto | |

FOREIGN PATENT DOCUMENTS

| | | |
|---|---|---|
| WO | WO 2004/075023 | 9/2004 |
| WO | WO 2004/107640 | 12/2004 |

* cited by examiner

*Primary Examiner*—Esaw T Abraham
(74) *Attorney, Agent, or Firm*—The Farrell Law Firm, LLP

(57) ABSTRACT

An apparatus and method for transmitting a signal in a communication system. An information vector is encoded using a structured low density parity check (LDPC) coding scheme supporting a first coding rate, to generate a first structured LDPC codeword vector including a first part mapped to the information vector and a second part mapped to a parity vector. The first structured LDPC codeword vector is transmitted to a signal reception apparatus. If there is an error in the first structured LDPC codeword vector, the information vector is encoded using a structured LDPC coding scheme supporting a second coding rate, to generate a second structured LDPC codeword vector including the first part, the second part, and a third part mapped to an additional parity vector of the information vector. The third part is transmitted to the signal reception apparatus.

12 Claims, 7 Drawing Sheets

| $Pa_{11}$ | $Pa_{12}$ | $Pa_{13}$ | $Pa_{14}$ | ... | $Pa_{1(q-1)}$ | $Pa_{1q}$ |
|---|---|---|---|---|---|---|
| $Pa_{21}$ | $Pa_{22}$ | $Pa_{23}$ | $Pa_{24}$ | ... | $Pa_{2(q-1)}$ | $Pa_{2q}$ |
| $Pa_{31}$ | $Pa_{32}$ | $Pa_{33}$ | $Pa_{34}$ | ... | $Pa_{3(q-1)}$ | $Pa_{3q}$ |
| ⋮ | ⋮ | ⋮ | ⋮ | ... | ⋮ | ⋮ |
| $Pa_{p1}$ | $Pa_{p2}$ | $Pa_{p3}$ | $Pa_{p4}$ | ... | $Pa_{p(q-1)}$ | $Pa_{pq}$ |

FIG.2

(PRIOR ART)

APPARATUS AND METHOD FOR TRANSMITTING AND RECEIVING A SIGNAL IN A COMMUNICATION SYSTEM

BACKGROUND OF THE INVENTION

1. Field of the Invention

The present invention relates generally to an apparatus and method for transmitting and receiving a signal in a communication system, and in particular, to an apparatus and method for transmitting and receiving a signal using structured Low Density Parity Check (LDPC) codes in a communication system.

2. Description of the Related Art

The next generation communication system has evolved into a packet service communication system. The packet service communication system, a system for transmitting burst packet data to a plurality of mobile stations (MSs), has been designed for high-capacity data transmission.

Various data transmission schemes, such as a Hybrid Automatic Repeat reQuest (HARQ) scheme and an Adaptive Modulation and Coding (AMC) scheme, have been proposed for the next generation communication system in order to increase data throughput. To support the HARQ scheme and the AMC scheme, the communication system must support various coding rates.

Commonly, the next generation communication system uses LDPC codes together with turbo codes. It is well known that the LDPC codes show a high performance gain when they are used for high-speed data transmission, and the LDPC codes effectively correct errors caused by noises generated in a transmission channel, thereby contributing to an increase in reliability of data transmission.

FIG. 1 is a block diagram illustrating a conventional communication system using LDPC codes. Referring to FIG. 1, the communication system includes a signal transmission apparatus 100 and a signal reception apparatus 150. The signal transmission apparatus 100 includes an encoder 111, a modulator 113, and a radio frequency (RF) processor 115, and the signal reception apparatus 150 includes an RF processor 151, a demodulator 153, and a decoder 155. If there is an information vector $\underline{s}$ that the signal transmission apparatus 100 desires to transmit, the information vector $\underline{s}$ is provided to the encoder 111. The encoder 111 encodes the information vector $\underline{s}$ into a codeword vector $\underline{c}$, i.e., an LDPC codeword, using a predetermined coding scheme, and outputs the generated codeword vector $\underline{c}$ to the modulator 113. Herein, the predetermined coding scheme refers to an LDPC coding scheme. The modulator 113 modulates the codeword vector $\underline{c}$ into a modulation vector $\underline{m}$ using a predetermined modulation scheme, and outputs the modulation vector $\underline{m}$ to the RF processor 115. The RF processor 115 RF-processes the modulation vector $\underline{m}$ output from the modulator 113, and transmits the RF-processed signal to the signal reception apparatus 150 via an antenna ANT.

The signal transmitted by the signal transmission apparatus 100 is received at the signal reception apparatus 150 via its antenna ANT, and the received signal is provided to the RF processor 151. The RF processor 151 RF-processes the received signal, and outputs the RF-processed vector $\underline{r}$ to the demodulator 153. The demodulator 153 demodulates the vector $\underline{r}$ output from the RF processor 151 using a demodulation scheme corresponding to the modulation scheme used in the modulator 113 of the signal transmission apparatus 100, and outputs the demodulated vector $\underline{x}$ to the decoder 155. The decoder 155 decodes the vector $\underline{x}$ output from the demodulator 153 using a decoding scheme corresponding to the coding scheme used in the encoder 111 of the signal transmission apparatus 100, and finally outputs the decoded signal $\underline{\hat{s}}$ as a restored information vector.

FIG. 2 is a diagram illustrating a parity check matrix of a conventional LDPC code. Referring to FIG. 2, a parity check matrix of the LDPC code is formed such that the full parity check matrix is divided into a plurality of blocks, and permutation matrixes are mapped to the individual blocks. It will be assumed herein that the permutation matrixes each have a size of $N_s \times N_s$.

As illustrated in FIG. 2, the parity check matrix of the structured LDPC code is divided into m×n blocks, and a permutation matrix is mapped to each of the m×n blocks. $P_{mn}$ represents a permutation matrix located in a point where an $m^{th}$ block row and an $n^{th}$ block column among the plurality of blocks in the parity check matrix cross each other. The permutation matrix mapped to each of the blocks will be referred to as a "block matrix." In a parity check matrix in which identity matrixes are selected for all the block matrixes, once a point of a non-zero element in a first row of each block is determined, points of the remaining ($N_s-1$) non-zero elements are determined. Therefore, the memory capacity required for storing the full information on the parity check matrix is reduced to $1/N_s$ as compared with the required memory capacity where points of the non-zero elements are irregularly selected.

The communication system uses various error control schemes for improvement of system reliability, and the Hybrid Automatic Repeat reQuest (HARQ) scheme is a scheme obtained by combining advantages of a Forward Error Correction (FEC) scheme and an Automatic Repeat reQuest (ARQ) scheme among the error control schemes. The HARQ scheme, i.e., a scheme for reducing the number of retransmissions by correcting a frequently generated error pattern using the FEC scheme, is classified into three types: Type-I, Type-II, and Type-III. A description will now be made of the three types of the HARQ scheme.

FIG. 3 is a diagram schematically illustrating a Type-I HARQ-based signal transmission and reception operation in a conventional communication system. However, before a description of FIG. 3 is given, it should be noted that the Type-I HARQ-based signal transmission and reception operation can be performed using either one code having both an error correction function and an error detection function, or two different codes, one of which has the error correction function and the other of which has the error detection function. Further, it is assumed in FIG. 3 that the Type-I HARQ-based signal transmission and reception operation is performed using the two different codes, one of which has the error correction function and the other of which has the error detection function.

Referring to FIG. 3, in the Type-I HARQ scheme, a signal transmission apparatus transmits codeword vectors in the same format at both initial transmission and retransmissions. That is, at initial transmission, the signal transmission apparatus encodes a k-bit information vector into a codeword vector (k',k) for error detection through a first encoder using a predetermined coding scheme, for example, a turbo coding scheme supporting a predetermined fixed coding rate, encodes again the codeword vector (k',k) into a codeword vector (n,k') for error correction through a second encoder using a predetermined coding scheme, for example, a turbo coding scheme supporting a predetermined fixed coding rate, and then transmits the codeword vector (n,k') as a final codeword vector.

Thereafter, at retransmission caused by an error occurred in the initially transmitted codeword vector, the signal transmission apparatus transmits the codeword vector (n,k') that was transmitted at initial transmission. Herein, a coding rate of the codeword vector (n,k') is assumed to be $R_0$, and because the codeword vector (n,k') was encoded by the turbo coding scheme, it is comprised of an information part $S_0$ mapped to the information vector and a parity part ($P_{00}$, $P_{01}$) mapped to a parity vector. As a result, in the Type-I HARQ scheme, the same coding rate $R_0$ is used for initial transmission and retransmissions, and thus the same codeword vector (n,k') is transmitted.

Upon receiving a codeword vector initially transmitted by the signal transmission apparatus, a signal reception apparatus decodes the received codeword vector through a first decoder using a decoding scheme corresponding to the coding scheme used in the signal transmission apparatus in order to correct an error in the received codeword vector. The decoding operation of the first decoder corresponds to an operation of encoding the codeword vector (n,k') in the second encoder of the signal transmission apparatus, and the received codeword vector, when it is correctly error-corrected, is restored to the codeword vector (k',k).

After error-correcting the received codeword vector, the signal reception apparatus decodes the error-corrected received codeword vector through a second decoder using a decoding scheme corresponding to the coding scheme used in the signal transmission apparatus, thereby detecting an error in the error-corrected received codeword vector. The decoding operation of the second decoder corresponds to an operation of encoding the codeword vector (k',k) in the first encoder of the signal transmission apparatus. Upon detecting an error in the error-corrected received codeword vector, the signal reception apparatus transmits negative acknowledgement (NAK) information indicating abnormal receipt of the initially transmitted codeword vector to the signal transmission apparatus in order to request retransmission of the corresponding codeword vector. The signal reception apparatus temporarily buffers the error-detected codeword vector in its buffer, preparing to combine the error-detected codeword vector with a retransmitted codeword vector. However, upon detecting no error in the error-corrected received codeword vector, the signal reception apparatus transmits acknowledgement (ACK) information indicating normal receipt of the initially transmitted codeword vector to the signal transmission apparatus.

If the signal transmission apparatus retransmits the codeword vector (n,k') that it transmitted at initial transmission, in response to the retransmission request for the codeword vector from the signal reception apparatus, the signal reception apparatus receives the codeword vector retransmitted by the signal transmission apparatus, error-corrects the received codeword vector through the first decoder, combines the error-corrected received codeword vector with the error-detected initially-transmitted codeword vector buffered therein, and then detects a possible error in the combined received codeword vector through the second decoder. Accordingly, the signal transmission apparatus and the signal reception apparatus repeatedly perform the Type-I HARQ-based signal transmission and reception operation until the k-bit information vector is normally restored within a predetermined number of retransmissions, or within a predetermined time.

As described above, because the signal transmission apparatus transmits the same codeword vector both at initial transmission and at subsequent retransmissions, the Type-I HARQ-based signal transmission and reception operation abruptly decreases system throughput in a poor channel condition.

FIG. 4 is a diagram schematically illustrating a Type-II HARQ-based signal transmission and reception operation in a conventional communication system. However, before a description of FIG. 4 is given, it should be noted that the Type-II HARQ-based signal transmission and reception operation can be performed using either one code having both an error correction function and an error detection function, or two different codes, one of which has the error correction function and the other of which has the error detection function. Further, it is assumed in FIG. 4 that the Type-II HARQ-based signal transmission and reception operation is performed using the two different codes, one of which has the error correction function and the other of which has the error detection function.

Referring to FIG. 4, in the Type-II HARQ scheme, a signal transmission apparatus transmits codeword vectors in different formats at initial transmission and retransmissions. That is, at initial transmission, the signal transmission apparatus encodes a k-bit information vector into a codeword vector (k',k) for error detection through a first encoder using a predetermined coding scheme, for example, a turbo coding scheme supporting a predetermined fixed coding rate, encodes again the codeword vector (k',k) into a codeword vector (n,k') for error correction through a second encoder using a predetermined coding scheme, for example, a turbo coding scheme supporting a predetermined fixed coding rate, and then transmits the codeword vector (n,k') as a final codeword vector. If it is assumed that coding rates supportable by the codeword vector (n,k') are $R_0$, $R_1$, . . . , $R_L$ (where $R_0 > R_1 > \ldots > R_L$), the signal transmission apparatus transmits a codeword vector (n,k')($R_0$) at initial transmission, where (n,k')($R_0$) denotes a codeword vector (n,k') at a coding rate $R_0$. Further, the codeword vector (n,k')($R_0$), because it was encoded by the turbo coding scheme, is comprised of an information part $S_0$ mapped to the information vector and a parity part ($P_{00}$, $P_{01}$) mapped to a parity vector.

Thereafter, at a retransmission caused by an error occurred in the initially transmitted codeword vector, the signal transmission apparatus transmits, to the signal reception apparatus, only the additional parity vector $P_1$ prepared for the codeword vector (n,k')($R_0$) for a codeword vector (n,k')($R_1$) being different from the codeword vector (n,k')($R_0$) that was transmitted at initial transmission. The codeword vector (n,k') ($R_1$) includes an information part $S_0$ mapped to the information vector and a parity part ($P_{00}$, $P_{01}$) and a parity part $P_1$ mapped to a parity vector. As a result, the signal transmission apparatus transmits only the parity part $P_1$ to the signal reception apparatus at retransmission.

Upon receiving a codeword vector initially transmitted by the signal transmission apparatus, a signal reception apparatus decodes the received codeword vector through a first decoder using a decoding scheme corresponding to the coding scheme used in the signal transmission apparatus in order to correct an error in the received codeword vector. The decoding operation of the first decoder corresponds to an operation of encoding the codeword vector (n,k') in the second encoder of the signal transmission apparatus, and the received codeword vector, when it is correctly error-corrected, is restored to the codeword vector (k',k).

After error-correcting the received codeword vector, the signal reception apparatus decodes the error-corrected received codeword vector through a second decoder using a decoding scheme corresponding to the coding scheme used in the signal transmission apparatus, thereby detecting an error in the error-corrected received codeword vector. The decoding operation of the second decoder corresponds to an operation of encoding the codeword vector (k',k) in the first encoder of the signal transmission apparatus.

Upon detecting an error in the error-corrected received codeword vector, the signal reception apparatus transmits NAK information indicating abnormal receipt of the initially transmitted codeword vector to the signal transmission apparatus in order to request retransmission of the corresponding codeword vector. The signal reception apparatus temporarily buffers the error-detected codeword vector in its buffer, preparing to combine the error-detected codeword vector with a retransmitted codeword vector. However, upon detecting no error in the error-corrected received codeword vector, the signal reception apparatus transmits ACK information indicating normal receipt of the initially transmitted codeword vector to the signal transmission apparatus.

If the signal transmission apparatus retransmits only the parity vector $P_1$ added to the codeword vector $(n,k')(R_0)$ that it transmitted at initial transmission, in response to the retransmission request for the codeword vector from the signal reception apparatus, the signal reception apparatus receives the codeword vector retransmitted by the signal transmission apparatus, error-corrects the received codeword vector through the first decoder, combines the error-corrected received codeword vector with the error-detected initially-transmitted codeword vector buffered therein, and then detects a possible error in the combined received codeword vector through the second decoder. Accordingly, the signal transmission apparatus and the signal reception apparatus repeatedly perform the Type-II HARQ-based signal transmission and reception operation until the k-bit information vector is normally restored within a predetermined number of retransmissions, or within a predetermined time.

As described above, in the Type-II HARQ-based signal transmission and reception operation, the signal transmission apparatus transmits only the additional parity vector for the previously transmitted codeword vector at retransmission. Therefore, if there is a fatal error in the codeword vector initially transmitted by the signal transmission apparatus, the signal reception apparatus may occasionally fail to correctly restore the information vector. Therefore, the signal transmission apparatus retransmits the initially transmitted codeword vector periodically, for example, at every predetermined number, L, of retransmissions, thereby enabling normal restoration of the information vector.

However, because the Type-II HARQ-based signal transmission and reception operation must generate a codeword vector (n,k') supporting a variable coding rate at retransmission, the signal transmission apparatus should include additional encoders to generate the codeword vector (n,k') and the signal reception apparatus should also include additional decoders to decode the codeword vector (n,k'). In addition, at retransmission, the signal transmission apparatus transmits only the parity vector added to the initially transmitted codeword vector, instead of transmitting the intact codeword vector (n,k') supporting the variable coding rate, so it must include puncturers for puncturing the remaining parts except for the additional parity vector. As a result, the Type-II HARQ-based signal transmission and reception operation causes an undesirable increase in hardware complexity.

FIG. 5 is a diagram schematically illustrating a Type-III HARQ-based signal transmission and reception operation in a conventional communication system. However, before a description of FIG. 5 is given, it should be noted that the Type-III HARQ-based signal transmission and reception operation can be performed using either one code having both an error correction function and an error detection function, or two different codes, one of which has the error correction function and the other of which has the error detection function. Further, it is assumed in FIG. 5 that the Type-III HARQ-based signal transmission and reception operation is performed using the two different codes, one of which has the error correction function and the other of which has the error detection function.

Referring to FIG. 5, in the Type-III HARQ scheme, a signal transmission apparatus transmits codeword vectors in different formats at initial transmission and retransmissions. That is, at an initial transmission, the signal transmission apparatus encodes a k-bit information vector into a codeword vector (k',k) for error detection through a first encoder using a predetermined coding scheme, for example, a turbo coding scheme supporting a predetermined fixed coding rate, encodes again the codeword vector (k',k) into a codeword vector (n,k') for error correction through a second encoder using a predetermined coding scheme, for example, a turbo coding scheme supporting a predetermined fixed coding rate, and then transmits the codeword vector (n,k') as a final codeword vector.

If it is assumed that coding rates supportable by the codeword vector (n,k') are $R_0, R_1, \ldots, R_L$ (where $R_0 > R_1 > \ldots > R_L$), the signal transmission apparatus transmits a codeword vector $(n,k')(R_0)$ at initial transmission, where $(n,k')(R_0)$ denotes a codeword vector (n,k') at a coding rate $R_0$. The codeword vector $(n,k')(R_0)$, because it was encoded by the turbo coding scheme, includes an information part $S_0$ mapped to the information vector and a parity part $(P_{00}, P_{01})$ mapped to a parity vector.

Thereafter, at retransmission caused by an error occurred in the initially transmitted codeword vector, the signal transmission apparatus transmits, to the signal reception apparatus, a codeword vector being different from the codeword vector $(n,k')(R_0)$ that was transmitted at initial transmission, i.e., an information part $S_0$ and an additional parity vector $P_1$ prepared for the codeword vector $(n,k')R_0$ for a codeword vector $(n,k')(R_1)$. The codeword vector $(n,k')(R_1)$ includes the information part $S_0$ mapped to the information vector and the parity part $(P_{00}, P_{01})$ and the parity part $P_1$ mapped to a parity vector. As a result, the signal transmission apparatus transmits the information part $S_0$ and the parity part P1 to the signal reception apparatus at retransmission.

Upon receiving a codeword vector initially transmitted by the signal transmission apparatus, a signal reception apparatus decodes the received codeword vector through a first decoder using a decoding scheme corresponding to the coding scheme used in the signal transmission apparatus, thereby to correct an error in the received codeword vector. The decoding operation of the first decoder corresponds to an operation of encoding the codeword vector (n,k') in the second encoder of the signal transmission apparatus, and the received codeword vector, when it is correctly error-corrected, is restored to the codeword vector (k',k).

After error-correcting the received codeword vector, the signal reception apparatus decodes the error-corrected received codeword vector through a second decoder using a decoding scheme corresponding to the coding scheme used in the signal transmission apparatus, thereby detecting an error in the error-corrected received codeword vector. The decoding operation of the second decoder corresponds to an operation of encoding the codeword vector (k',k) in the first encoder of the signal transmission apparatus.

Upon detecting an error in the error-corrected received codeword vector, the signal reception apparatus transmits NAK information indicating abnormal receipt of the initially transmitted codeword vector to the signal transmission apparatus in order to request retransmission of the corresponding codeword vector. The signal reception apparatus temporarily buffers the error-detected codeword vector in its buffer, preparing to combine the error-detected codeword vector with a retransmitted codeword vector. However, upon detecting no error in the error-corrected received codeword vector, the signal reception apparatus transmits ACK information indicating normal receipt of the initially transmitted codeword vector to the signal transmission apparatus.

If the signal transmission apparatus retransmits the information part $S_0$ and the parity vector $P_1$ other than the codeword vector $(n,k')(R_0)$ that it transmitted at initial transmission, in response to the retransmission request for the codeword vector from the signal reception apparatus, the signal reception apparatus receives the codeword vector retransmitted by the signal transmission apparatus, error-corrects the received codeword vector through the first decoder, combines the error-corrected received codeword vector with the error-detected initially-transmitted codeword vector buffered therein, and then detects a possible error in the combined received codeword vector through the second decoder. Accordingly, the signal transmission apparatus and the signal reception apparatus repeatedly perform the Type-III HARQ-based signal transmission and reception operation until the k-bit information vector is normally restored within a predetermined number of retransmissions, or within a predetermined time.

As described above, in the Type-III HARQ-based signal transmission and reception operation, the signal transmission apparatus transmits the information part other than the previously transmitted codeword vector, and the additional parity part, i.e., a new parity part, at retransmission. Therefore, the signal reception apparatus can normally restore the information vector using only the retransmitted codeword vector. That is, the signal reception apparatus is self-decodable.

However, because the Type-III HARQ-based signal transmission and reception operation must generate a codeword vector $(n,k')$ supporting a variable coding rate at retransmission, the signal transmission apparatus should include additional encoders to generate the codeword vector $(n,k')$ and the signal reception apparatus should also include additional decoders to decode the codeword vector $(n,k')$. In addition, at retransmission, the signal transmission apparatus transmits the information part and the additional parity part, instead of transmitting the intact codeword vector $(n,k')$ supporting the variable coding rate, so it must include puncturers for puncturing the remaining parts except for the additional parity vector. As a result, the Type-III HARQ-based signal transmission and reception operation causes an undesirable increase in hardware complexity.

SUMMARY OF THE INVENTION

It is, therefore, an object of the present invention to provide an apparatus and method for transmitting and receiving a signal in a communication system.

It is another object of the present invention to provide a Type-II HARQ-based signal transmission and reception apparatus and method having minimized hardware complexity in a communication system.

It is further another object of the present invention to provide a Type-III HARQ-based signal transmission and reception apparatus and method having minimized hardware complexity in a communication system.

According to one aspect of the present invention, there is provided a method for transmitting a signal in a communication system. The method includes the steps of: receiving an information vector to transmit; encoding the information vector using a structured low density parity check (LDPC) coding scheme supporting a first coding rate; generating a first structured LDPC codeword vector including a first part mapped to the information vector and a second part mapped to a parity vector; transmitting the first structured LDPC codeword vector to a signal reception apparatus; upon detecting an error occurred in the first structured LDPC codeword vector, encoding the information vector using a structured LDPC coding scheme supporting a second coding rate, and generating a second structured LDPC codeword vector including the first part, the second part, and a third part mapped to an additional parity vector of the information vector; and transmitting the third part to the signal reception apparatus.

BRIEF DESCRIPTION OF THE DRAWINGS

The above and other objects, features, and advantages of the present invention will become more apparent from the following detailed description when taken in conjunction with the accompanying drawings in which:

FIG. 2 is a diagram illustrating a parity check matrix of a conventional LDPC code;

DETAILED DESCRIPTION OF PREFERRED EMBODIMENTS

Figure 1:
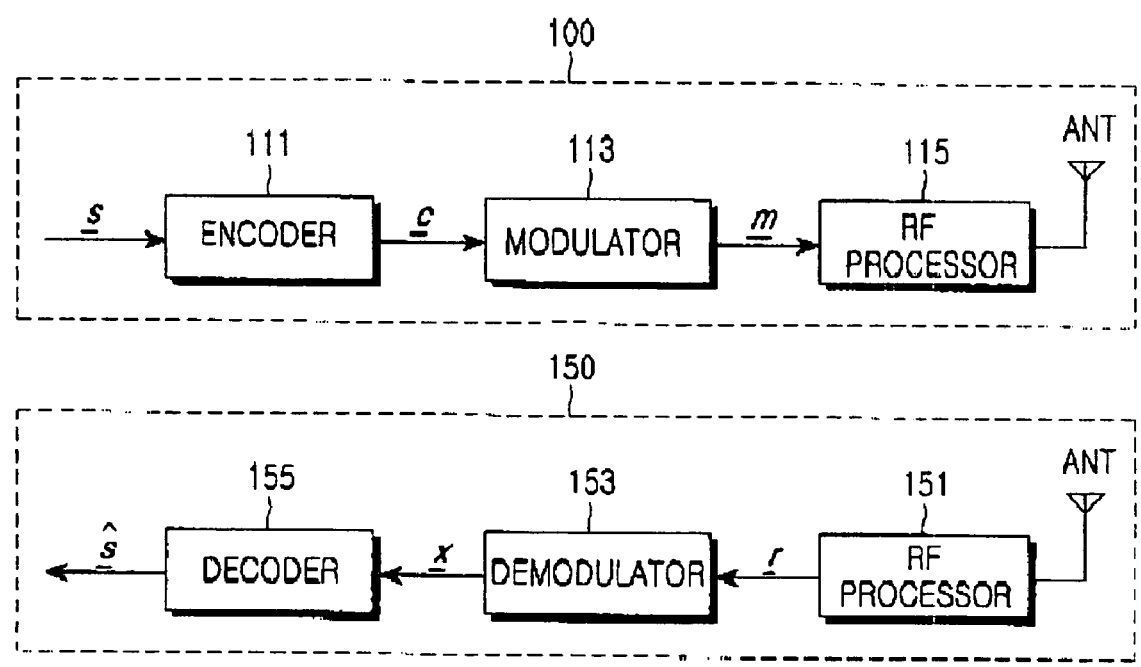
FIG. 1 is a block diagram illustrating a conventional communication system using LDPC codes.
Figure 3:
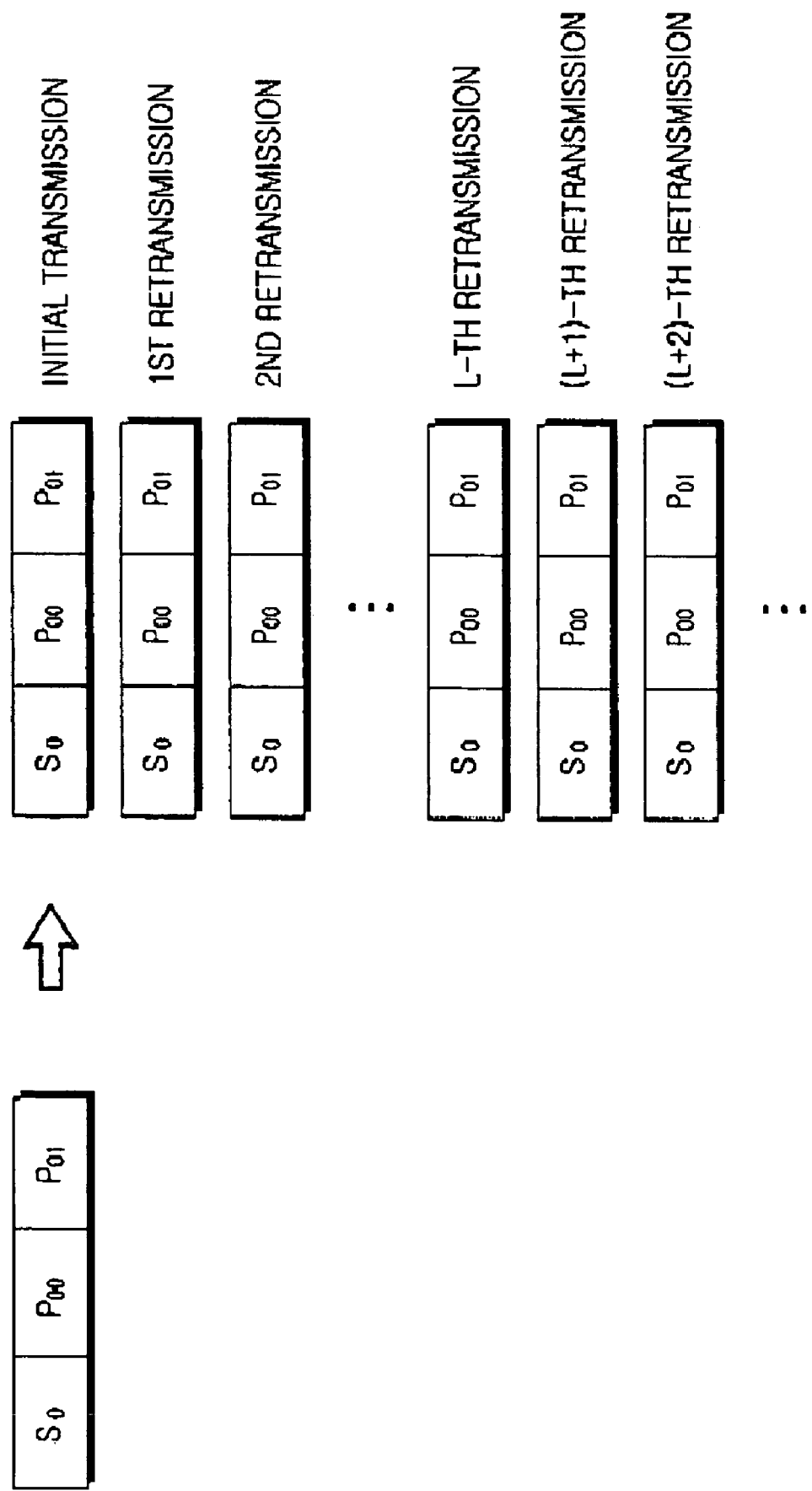
FIG. 3 is a diagram schematically illustrating a Type-I HARQ-based signal transmission and reception operation in a conventional communication system.
Figure 4:
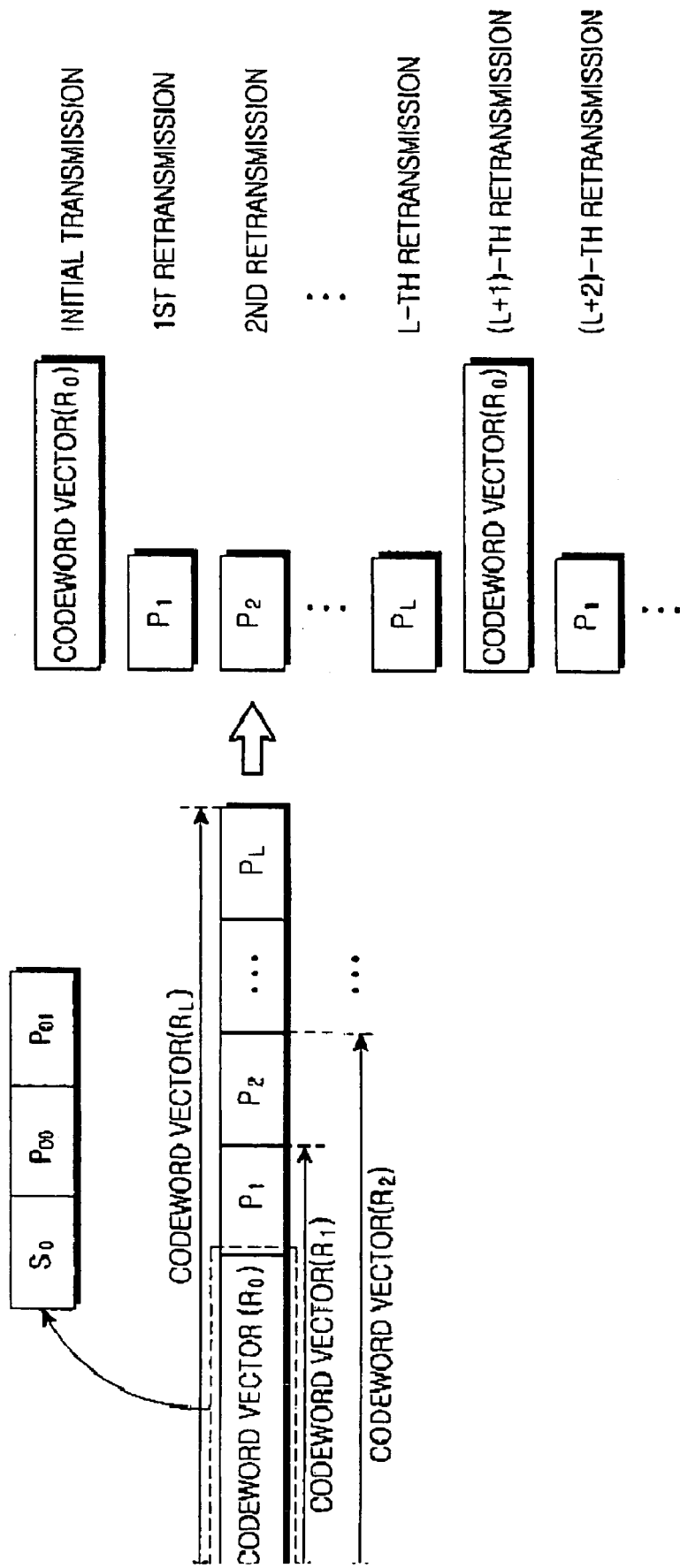
FIG. 4 is a diagram schematically illustrating a Type-II HARQ-based signal transmission and reception operation in a conventional communication system.
Figure 5:
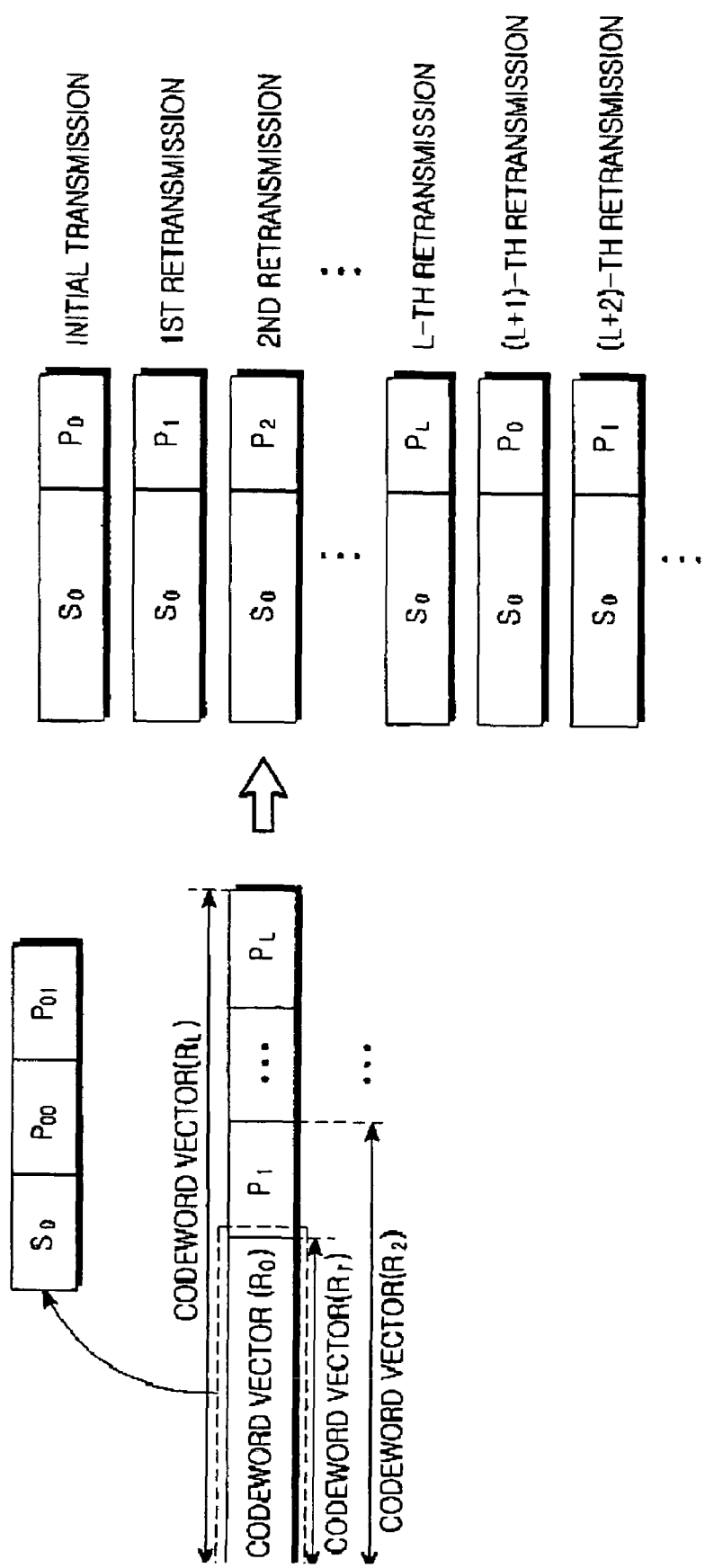
FIG. 5 is a diagram schematically illustrating a Type-III HARQ-based signal transmission and reception operation in a conventional communication system.

Preferred embodiments of the present invention will now be described in detail herein below with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention proposes a signal transmission and reception apparatus and method in a communication system. In particular, the present invention proposes an apparatus and method for transmitting and receiving signals using a structured Low Density Parity Check (LDPC) code. Further, the present invention proposes a signal transmission and reception apparatus and method for minimizing hardware complexity with the use of the structured LDPC code in the process of transmitting and receiving signals by applying a Type-II Hybrid Automatic Repeat request (HARQ) scheme and a Type-III HARQ scheme. Although not separately illustrated, the present invention can apply an operation of transmitting and receiving signals using a proposed structured LDPC code to the signal transmission and reception apparatus in a communication system illustrated in FIG. 1.

An encoder and a decoder for a structured LDPC code can generate and decode the structured LDPC code, storing only a very small quantity of a parity check matrix according to a characteristic of the LDPC code. That is, the encoder and the decoder can generate and decode a structured LDPC code by storing parity check matrixes corresponding to the structured LDPC code having different multiple coding rates and block sizes, or a codeword size, in a memory and applying different coding rates according to channel conditions of the communication system. Therefore, the structured LDPC code can be generated and decoded by simply modifying the parity check matrixes according to a change in the coding rate and block size, without having to modify the hardware structure of the encoder and the decoder. However, using the convolutional code and the turbo code having a structure obtained by concatenating the convolutional codes, both of which are generally used in the current communication system, if the coding rate and block size are changed, the hardware structure of the encoder and decoder should be modified according to the changed coding rate and block size.

Figure 6:
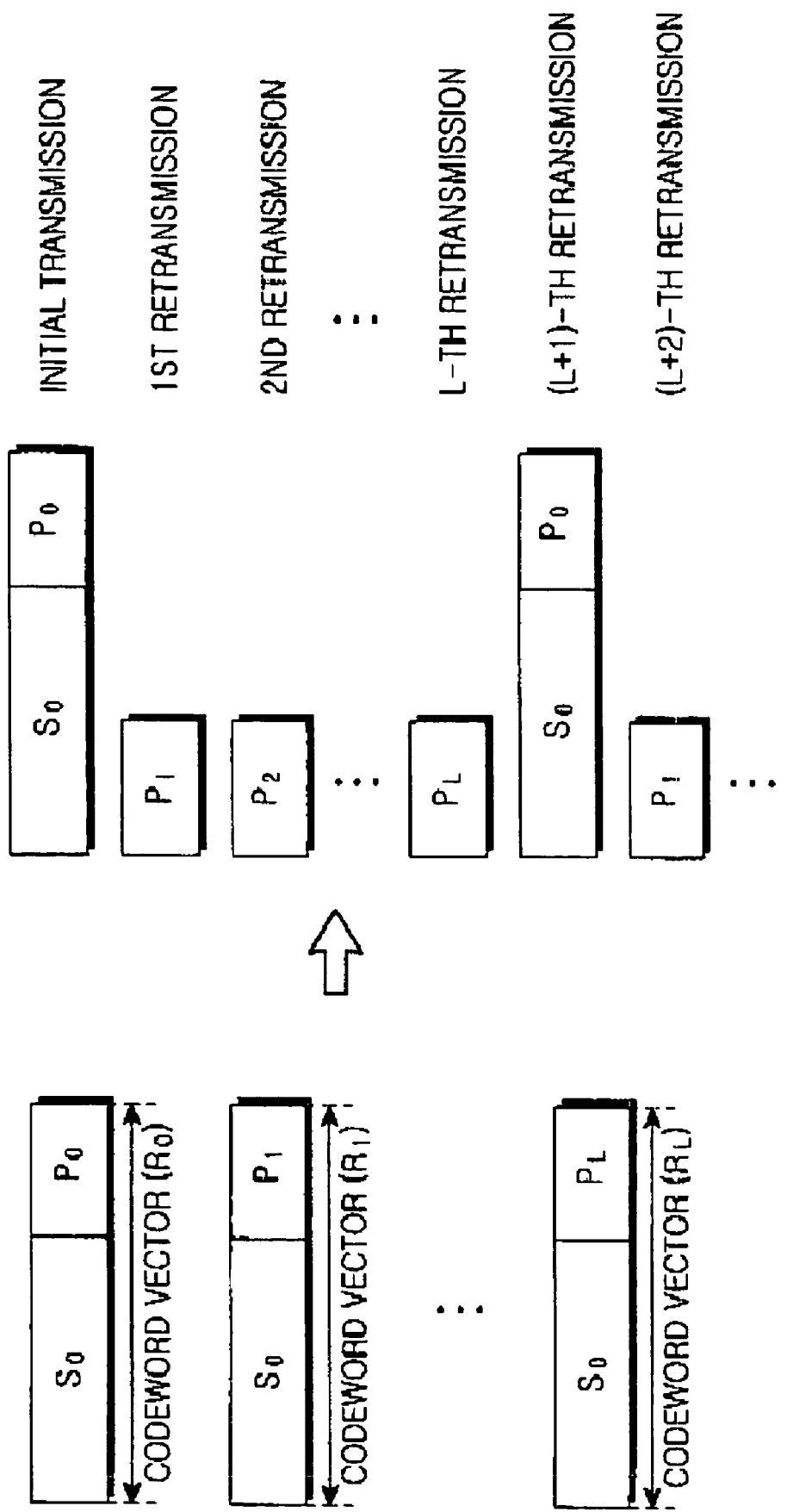
FIG. 6 is a diagram schematically illustrating a Type-II HARQ-based signal transmission and reception operation in a communication system according to an embodiment of the present invention.

Therefore, the present invention proposes an apparatus and method for transmitting and receiving signals based on a HARQ scheme using a structured LDPC code. With reference to FIG. 6, a signal transmission and reception operation based on a Type-II HARQ scheme proposed in an embodiment of the present invention will be described, and with reference to FIG. 7, a signal transmission and reception operation based on a Type-III HARQ scheme proposed in an embodiment of the present invention will be described.

However, before a description of the Type-II HARQ-based signal transmission and reception operation and the Type-III HARQ-based signal transmission and reception operation is given, a Type-I. HARQ-based signal transmission and reception operation will be described below.

The Type-I HARQ-based signal transmission and reception operation can be performed using either one code having both an error correction function and an error detection function, or two different codes, one of which has the error correction function and the other of which has the error detection function. Further, it is assumed herein that the Type-I HARQ-based signal transmission and reception operation is performed using the two different codes, one of which has the error correction function and the other of which has the error detection function.

In the Type-I HARQ scheme, a signal transmission apparatus transmits codeword vectors in the same format at both initial transmission and retransmissions. That is, at initial transmission, the signal transmission apparatus encodes a k-bit information vector into a codeword vector (k',k) for error detection through a first encoder using a predetermined coding scheme, for example, a structured LDPC coding scheme supporting a predetermined fixed coding rate, encodes again the codeword vector (k',k) into a codeword vector (n,k') for error correction through a second encoder using a predetermined coding scheme, for example, a structured LDPC coding scheme supporting a predetermined fixed coding rate, and then transmits the codeword vector (n,k') as a final codeword vector.

Thereafter, at retransmission caused by an error occurred in the initially transmitted codeword vector, the signal transmission apparatus transmits the codeword vector (n,k') that was transmitted at initial transmission. Herein, a coding rate of the codeword vector (n,k') is assumed to be $R_0$, and the codeword vector (n,k') includes an information part $S_0$ mapped to the information vector and a parity part $P_0$ mapped to a parity vector. As a result, in the Type-I HARQ scheme, the same coding rate $R_0$ is used for both initial transmission and retransmissions, and thus the same codeword vector (n,k') is transmitted.

Upon receiving a codeword vector initially transmitted by the signal transmission apparatus, a signal reception apparatus decodes the received codeword vector through a first decoder using a decoding scheme corresponding to the coding scheme used in the signal transmission apparatus in order to correct an error in the received codeword vector. The decoding operation of the first decoder corresponds to an operation of generating the codeword vector (n,k') in the second encoder of the signal transmission apparatus, and the received codeword vector, when it is correctly error-corrected, is restored to the codeword vector (k',k).

After error-correcting the received codeword vector, the signal reception apparatus decodes the error-corrected received codeword vector through a second decoder using a decoding scheme corresponding to the coding scheme used in the signal transmission apparatus, thereby detecting an error in the error-corrected received codeword vector. The decoding operation of the second decoder corresponds to an operation of generating the codeword vector (k',k) in the first encoder of the signal transmission apparatus.

Upon detecting an error in the error-corrected received codeword vector, the signal reception apparatus transmits negative acknowledgement (NAK) information indicating abnormal receipt of the initially transmitted codeword vector to the signal transmission apparatus in order to request retransmission of the corresponding codeword vector. The signal reception apparatus temporarily buffers the error-detected codeword vector in its buffer, preparing to combine the error-detected codeword vector with a retransmitted codeword vector. However, upon detecting no error in the error-corrected received codeword vector, the signal reception apparatus transmits acknowledgement (ACK) information indicating normal receipt of the initially transmitted codeword vector to the signal transmission apparatus.

If the signal transmission apparatus retransmits the codeword vector (n,k') that it transmitted at initial transmission, in response to the retransmission request for the codeword vector from the signal reception apparatus, the signal reception apparatus receives the codeword vector retransmitted by the signal transmission apparatus, error-corrects the received codeword vector through the first decoder, combines the error-corrected received codeword vector with the error-detected initially-transmitted codeword vector buffered therein, and then detects a possible error in the combined received codeword vector through the second decoder.

In the foregoing description, upon receiving NAK information from the signal reception apparatus, the signal transmission apparatus retransmits the signal corresponding to the NAK information. However, upon failure to receive any response from the signal reception apparatus within a predetermined time after initial transmission, i.e., upon failure to receive the ACK or NAK information, the signal transmission apparatus may perform the signal retransmission operation, determining that there is an error in the initially transmitted signal.

Accordingly, the signal transmission apparatus and the signal reception apparatus repeatedly perform the Type-I HARQ-based signal transmission and reception operation until the k-bit information vector is normally restored within a predetermined number of retransmissions, or within a predetermined time.

FIG. 6 is a diagram schematically illustrating a Type-II HARQ-based signal transmission and reception operation in a communication system according to an embodiment of the present invention. However, before a description of FIG. 6 is given, it should be noted that the Type-II HARQ-based signal transmission and reception operation can be performed using either one code having both an error correction function and an error detection function, or two different codes, one of which has the error correction function and the other of which has the error detection function. Further, it is assumed in FIG. 6 that the Type-II HARQ-based signal transmission and reception operation is performed using the two different codes, one of which has the error correction function and the other of which has the error detection function.

Referring to FIG. 6, in the Type-II HARQ scheme, a signal transmission apparatus transmits codeword vectors in different formats at initial transmission and retransmissions, as described above. Therefore, in an embodiment of the present invention, at initial transmission, the signal transmission apparatus encodes a k-bit information vector into a codeword vector (k',k) for error detection through a first encoder using a predetermined coding scheme, for example, a structured LDPC coding scheme supporting a predetermined fixed coding rate, encodes again the codeword vector (k',k) into a codeword vector (n,k') for error correction through a second encoder using a predetermined coding scheme, for example, a structured LDPC coding scheme supporting a predetermined fixed coding rate, and then transmits the codeword vector (n,k') as a final codeword vector. If it is assumed that coding rates supportable by the codeword vector (n,k') are $R_0$, $R_1, \ldots, R_L$ (where $R_0 > R_1 > \ldots > R_L$), the signal transmission apparatus transmits a codeword vector (n,k')($R_0$) at initial transmission, where (n,k')($R_0$) denotes a codeword vector (n,k') at a coding rate $R_0$. The codeword vector (n,k')($R_0$), because it was encoded by the structured LDPC coding scheme, includes an information part $S_0$ mapped to the information vector and a parity part $P_0$ mapped to a parity vector.

Thereafter, at a retransmission caused by an error occurred in the initially transmitted codeword vector, the signal transmission apparatus transmits, to the signal reception apparatus, only the additional parity vector $P_1$ prepared for the codeword vector (n,k')($R_0$) for a codeword vector (n,k')($R_1$) being different from the codeword vector (n,k')($R_0$) that was transmitted at initial transmission. The codeword vector (n,k') ($R_1$) includes an information part $S_0$ mapped to the information vector and a parity part $P_0$ and a parity part $P_1$ mapped to a parity vector. As a result, the signal transmission apparatus transmits only the parity part $P_1$ to the signal reception apparatus at retransmission.

Upon receiving a codeword vector initially transmitted by the signal transmission apparatus, the signal reception apparatus decodes the received codeword vector through a first decoder using a decoding scheme corresponding to the coding scheme used in the signal transmission apparatus in order to correct an error in the received codeword vector. The decoding operation of the first decoder corresponds to an operation of encoding the codeword vector (n,k') in the second encoder of the signal transmission apparatus, and the received codeword vector, when it is correctly error-corrected, is restored to the codeword vector (k',k).

After error-correcting the received codeword vector, the signal reception apparatus decodes the error-corrected received codeword vector through a second decoder using a decoding scheme corresponding to the coding scheme used in the signal transmission apparatus in order to detect an error in the error-corrected received codeword vector. The decoding operation of the second decoder corresponds to an operation of generating the codeword vector (k',k) in the first encoder of the signal transmission apparatus.

Upon detecting an error in the error-corrected received codeword vector, the signal reception apparatus transmits NAK information indicating abnormal receipt of the initially transmitted codeword vector to the signal transmission apparatus, to request retransmission of the corresponding codeword vector. The signal reception apparatus temporarily buffers the error-detected codeword vector in its buffer, preparing to combine the error-detected codeword vector with a retransmitted codeword vector. However, upon detecting no error in the error-corrected received codeword vector, the signal reception apparatus transmits ACK information indicating normal receipt of the initially transmitted codeword vector to the signal transmission apparatus.

If the signal transmission apparatus retransmits only the parity vector $P_1$ added to the codeword vector (n,k')($R_0$) that it transmitted at initial transmission, in response to the retransmission request for the codeword vector from the signal reception apparatus, the signal reception apparatus receives the codeword vector retransmitted by the signal transmission apparatus, error-corrects the received codeword vector through the first decoder, combines the error-corrected received codeword vector with the error-detected initially-transmitted codeword vector buffered therein, and then detects a possible error in the combined received codeword vector through the second decoder.

In the foregoing description, upon receiving NAK information from the signal reception apparatus, the signal transmission apparatus retransmits the signal corresponding to the NAK information. However, upon failure to receive any response from the signal reception apparatus within a predetermined time after initial transmission, i.e., upon failure to receive the ACK or NAK information, the signal transmission apparatus may perform the signal retransmission operation, determining that there is an error in the initially transmitted signal. In this manner, the signal transmission apparatus and the signal reception apparatus repeatedly perform the Type-II HARQ-based signal transmission and reception operation until the k-bit information vector is normally restored within a predetermined number of retransmissions, or within a predetermined time.

As described above, in the Type-II HARQ-based signal transmission and reception operation, the signal transmission apparatus transmits only the additional parity vector for the previously transmitted codeword vector at retransmission. Therefore, if there is a fatal error in the codeword vector initially transmitted by the signal transmission apparatus, the signal reception apparatus may occasionally fail to correctly restore the information vector. Therefore, the signal transmission apparatus retransmits the initially transmitted codeword vector periodically, for example, at every predetermined number, L, of retransmissions, in order to enable normal restoration of the information vector.

As described above, in the Type-II HARQ-based signal transmission and reception operation, the signal transmission apparatus must generate a codeword vector (n,k') supporting a variable coding rate at retransmission. According to an embodiment of the present invention in which the structured LDPC code is used, however, the signal transmission apparatus is not required to include additional encoders to generate the codeword vector (n,k'), and the signal reception apparatus is also not required to include additional decoders to decode the codeword vector (n,k'). The codeword vector (n,k') supporting the variable coding rate can be generated and decoded by simply storing a corresponding parity check matrix in the signal transmission and reception apparatus.

That is, the signal transmission apparatus and the signal reception apparatus can generate and decode the codeword vector (n,k') by simply storing a plurality of parity check matrixes for supporting a variable coding rate, i.e., supporting a plurality of coding rates. The signal transmission apparatus and the signal reception apparatus can either use the intact parity check matrix initially given in the communication system, i.e., a parent parity check matrix, as a parity check matrix for supporting the variable coding rate, or use a child parity check matrix generated by modifying the parent parity check matrix.

Alternatively, the signal transmission apparatus and the signal reception apparatus can previously store therein a plurality of parity check matrixes individually mapped to the plurality of coding rates, and use the parity check matrixes mapped to their associated coding rates if needed. The use of the structured LDPC code, compared with the use of the conventional LDPC code, reduces memory capacity required for storing the parity check matrix.

More specifically, a parity check matrix of the LDPC code, as described above, is formed such that the full parity check matrix is divided into a plurality of blocks, and permutation matrixes are mapped to the individual blocks. It will be assumed herein that the permutation matrixes each have a size of $N_s \times N_s$, the parity check matrix of the structured LDPC code is divided into m×n blocks, and a permutation matrix is mapped to each of the m×n blocks. The permutation matrix mapped to each of the blocks will be referred to as a "block matrix." When the parity check matrix in which identity matrixes are selected for all the block matrixes, once a point of a non-zero element in a first row of each block is determined, points of the remaining $(N_s-1)$ non-zero elements are determined. Therefore, the memory capacity required for storing the full information on the parity check matrix is reduced to 1/Ns as compared with the required memory capacity for the case where points of the non-zero elements are irregularly selected.

As a result, the use of the structured LDPC code enables the Type-II HARQ-based signal transmission and reception operation without an increase in the hardware complexity.

Figure 7:
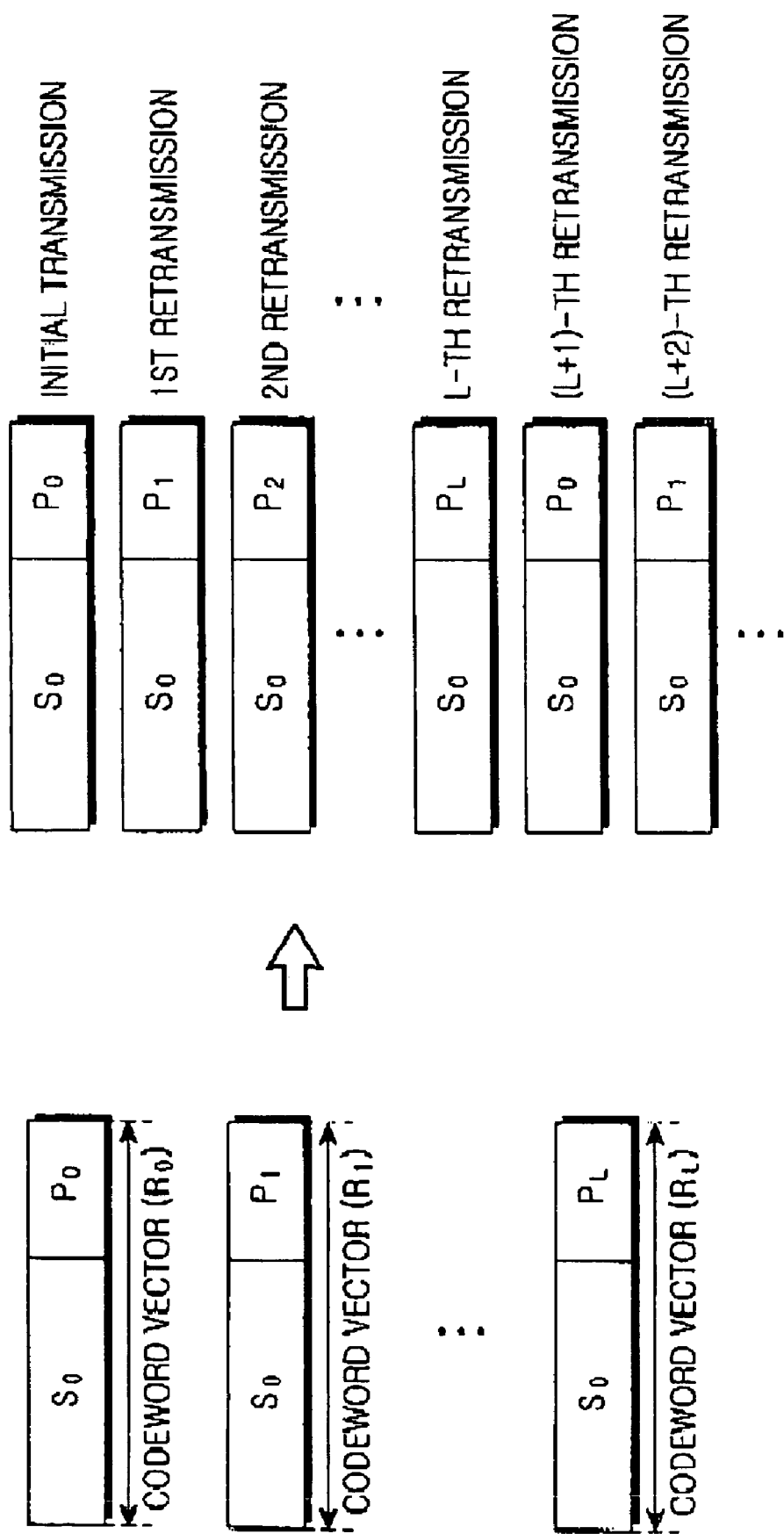
FIG. 7 is a diagram schematically illustrating a Type-III HARQ-based signal transmission and reception operation in a communication system according to an embodiment of the present invention.

FIG. 7 is a diagram schematically illustrating a Type-III HARQ-based signal transmission and reception operation in a communication system according to an embodiment of the present invention. However, before a description of FIG. 7 is given, it should be noted that the Type-III HARQ-based signal transmission and reception operation can be performed using either one code having both an error correction function and an error detection function, or two different codes, one of which has the error correction function and the other of which has the error detection function. Further, it is assumed in FIG. 7 that the Type-III HARQ-based signal transmission and reception operation is performed using the two different codes, one of which has the error correction function and the other of which has the error detection function.

Referring to FIG. 7, in the Type-III HARQ scheme, a signal transmission apparatus transmits codeword vectors in different formats at initial transmission and retransmissions. That, is at an initial transmission, the signal transmission apparatus encodes a k-bit information vector into a codeword vector (k',k) for error detection through a first encoder using a predetermined coding scheme, for example, a structured LDPC coding scheme supporting a predetermined fixed coding rate, encodes again the codeword vector (k',k) into a codeword vector (n,k') for error correction through a second encoder using a predetermined coding scheme, for example, a structured LDPC coding scheme supporting a predetermined fixed coding rate, and then transmits the codeword vector (n,k') as a final codeword vector. If it is assumed that coding rates supportable by the codeword vector (n,k') are $R_0, R_1, \ldots, R_L$ (where $R_0 > R_1 > \ldots > R_L$), the signal transmission apparatus transmits a codeword vector $(n,k')(R_0)$ at initial transmission, where $(n,k')(R_0)$ denotes a codeword vector (n,k') at a coding rate $R_0$. The codeword vector $(n,k')(R_0)$, because it was encoded by the structured LDPC coding scheme, includes an information part $S_0$ mapped to the information vector and a parity part $P_0$ mapped to a parity vector.

Thereafter, at a retransmission caused by an error occurred in the initially transmitted codeword vector, the signal transmission apparatus transmits, to the signal reception apparatus, a codeword vector being different from the codeword vector $(n,k')(R_0)$ that was transmitted at initial transmission, i.e., an information part $S_0$ and an additional parity vector $P_1$ prepared for the codeword vector $(n,k')(R_0)$ for a codeword vector $(n,k')(R_1)$. The codeword vector $(n,k')(R_1)$ includes an information part $S_0$ mapped to the information vector and a parity part $P_0$ and a parity part $P_1$ mapped to a parity vector. As a result, the signal transmission apparatus transmits the information part $S_0$ and the parity part $P_1$ to the signal reception apparatus at retransmission.

Upon receiving a codeword vector initially transmitted by the signal transmission apparatus, the signal reception apparatus decodes the received codeword vector through a first decoder using a decoding scheme corresponding to the coding scheme used in the signal transmission apparatus, thereby to correct an error in the received codeword vector. The decoding operation of the first decoder corresponds to an operation of encoding the codeword vector (n,k') in the second encoder of the signal transmission apparatus, and the received codeword vector, when it is correctly error-corrected, is restored to the codeword vector (k',k).

After error-correcting the received codeword vector, the signal reception apparatus decodes the error-corrected received codeword vector through a second decoder using a decoding scheme corresponding to the coding scheme used in the signal transmission apparatus, thereby detecting an error in the error-corrected received codeword vector. The decoding operation of the second decoder corresponds to an operation of encoding the codeword vector (k',k) in the first encoder of the signal transmission apparatus.

Upon detecting an error in the error-corrected received codeword vector, the signal reception apparatus transmits NAK information indicating abnormal receipt of the initially transmitted codeword vector to the signal transmission apparatus, to request retransmission of the corresponding codeword vector. The signal reception apparatus temporarily buffers the error-detected codeword vector in its buffer, preparing to combine the error-detected codeword vector with a retransmitted codeword vector. However, upon detecting no error in the error-corrected received codeword vector, the signal reception apparatus transmits ACK information indicating normal receipt of the initially transmitted codeword vector to the signal transmission apparatus.

If the signal transmission apparatus retransmits the information part $S_0$ and the parity vector $P_1$ other than the codeword vector $(n,k')(R_0)$ that it transmitted at initial transmission, in response to the retransmission request for the codeword vector from the signal reception apparatus, the signal reception apparatus receives the codeword vector retransmitted by the signal transmission apparatus, error-corrects the received codeword vector through the first decoder, combines the error-corrected received codeword vector with the error-detected initially-transmitted codeword vector buffered therein, and then detects a possible error in the combined received codeword vector through the second decoder.

In the foregoing description, upon receiving NAK information from the signal reception apparatus, the signal transmission apparatus retransmits the signal corresponding to the NAK information. However, upon failure to receive any response from the signal reception apparatus within a predetermined time after initial transmission, i.e., upon failure to receive the ACK or NAK information, the signal transmission apparatus may perform the signal retransmission operation, determining that there is an error in the initially transmitted signal.

Accordingly, the signal transmission apparatus and the signal reception apparatus repeatedly perform the Type-III HARQ-based signal transmission and reception operation until the k-bit information vector is normally restored within a predetermined number of retransmissions, or within a predetermined time.

As described above, in the Type-III HARQ-based signal transmission and reception operation, the signal transmission apparatus transmits the information part other than the previously transmitted codeword vector, and the additional parity part, i.e., a new parity part, at retransmission. Therefore, the signal reception apparatus can normally restore the information vector using only the retransmitted codeword vector. That is, the signal reception apparatus is self-decodable.

As described above, in the Type-III HARQ-based signal transmission and reception operation, the signal transmission apparatus must generate a codeword vector (n,k') supporting a variable coding rate at retransmission. According to an embodiment of the present invention in which the structured LDPC code is used, however, the signal transmission apparatus is not required to include additional encoders to generate the codeword vector (n,k'), and the signal reception apparatus is also not required to include additional decoders to decode the codeword vector (n,k'). The codeword vector (n,k') supporting the variable coding rate can be generated and decoded by simply storing a corresponding parity check matrix in the signal transmission and reception apparatus. As a result, the use of the structured LDPC code enables the Type-III HARQ-based signal transmission and reception operation without an increase in the hardware complexity.

As can be understood from the foregoing description, an embodiment of the present invention performs a HARQ-based signal transmission and reception operation using the structured LDPC code enables in the communication system, enabling signal transmission and reception with lower hardware complexity. More specifically, an embodiment of the present invention can enable signal transmission and reception without additional encoders and decoders in the process of transmitting and receiving signals based on Type-II and Type-III HARQ schemes in which the variable coding rate must be supported.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting a signal in a communication system, the method comprising:
    receiving an information vector to transmit;
    generating a first structured low density parity check (LDPC) codeword vector including a first part mapped to the information vector and a second part mapped to a parity vector by encoding the information vector using a structured LDPC coding scheme supporting a first coding rate;
    transmitting the first structured LDPC codeword vector to a signal reception apparatus;
    detecting an error occurred upon reception of the first structured LDPC codeword vector;
    generating a second structured LDPC codeword vector including the first part, the second part, and a third part mapped to an additional parity vector by encoding the information vector using a structured LDPC coding scheme supporting a second coding rate; and
    transmitting the third part of the second structured LDPC codeword vector to the signal reception apparatus.

2. The method of claim 1, further comprising transmitting the first part with third part of the second structured LDPC codeword vector to the signal reception apparatus.

3. The method of claim 1, wherein the structured LDPC coding scheme supporting the first coding rate is based on a first child parity check matrix, wherein the first child parity check matrix is generated based on a parent parity check matrix according to the first coding rate.

4. The method of claim 3, wherein the structured LDPC coding scheme supporting the second coding rate is based on a second child parity check matrix, wherein the second child parity check matrix is generated based on the parent parity check matrix according to the second coding rate.

5. The method of claim 1, wherein the structured LDPC coding scheme supporting the first coding rate is based on one of plurality of parity check matrixes according to the first coding rate.

6. The method of claim 1, wherein the structured LDPC coding scheme supporting the second coding rate is based on one of plurality of parity check matrixes according to the second coding rate.

7. An apparatus for transmitting a signal in a communication system, the apparatus comprising:
    an encoder for encoding an information vector using a structured low density parity check (LDPC) coding scheme supporting a first coding rate to generate a first structured LDPC codeword vector including a first part mapped to the information vector and a second part mapped to a parity vector, and encoding the information vector using a structured LDPC coding scheme supporting a second coding rate to generate a second structured LDPC codeword vector including the first part, the second part, and a third part mapped to an additional parity vector;
    a transmitter for transmitting the first structured LDPC codeword vector to a signal reception apparatus and transmitting the third part of the second structured LDPC codeword vector to the signal reception apparatus, when an error is detected by the signal reception apparatus in the first structured LDPC codeword vector; and
    a controller for, at initial transmission, performing a control operation of encoding the information vector using a structured LDPC coding scheme supporting the first coding rate to transmit the first structured LDPC codeword vector to the signal reception apparatus, and detecting the error occurred upon reception of the first structured LDPC codeword vector, encoding the information vector using a structured LDPC coding scheme supporting the second coding rate to transmit the third part of the second structured LDPC codeword vector to the signal reception apparatus.

8. The apparatus of claim 7, wherein the first part is transmitted with the third part of the second structured LDPC codeword vector to the signal reception apparatus.

9. The apparatus of claim 7, wherein the structured LDPC coding scheme supporting the first coding rate is based on a first child parity cheek matrix, wherein the first child parity check matrix is generated based on a parent parity check matrix according to the first coding rate.

10. The apparatus of claim 9, wherein the structured LDPC coding scheme supporting the second coding rate is based on a second child parity check matrix, wherein the second child parity check matrix is generated based on the parent parity check matrix according to the second coding rate.

11. The apparatus of claim 7, wherein the structured LDPC coding scheme supporting the first coding rate is based on one of plurality of parity check matrixes according to the first coding rate.

12. The apparatus of claim 7, wherein the structured LDPC coding scheme supporting the second coding rate is based on one of plurality of parity check matrixes according to the second coding rate.

* * * * *

UNITED STATES PATENT AND TRADEMARK OFFICE
CERTIFICATE OF CORRECTION

PATENT NO. : 7,584,399 B2  Page 1 of 1
APPLICATION NO. : 11/323756
DATED : September 1, 2009
INVENTOR(S) : Kyung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 805 days.

Signed and Sealed this

Fourteenth Day of September, 2010

David J. Kappos
*Director of the United States Patent and Trademark Office*